US006930428B2

United States Patent
Gründl et al.

(10) Patent No.: US 6,930,428 B2
(45) Date of Patent: Aug. 16, 2005

(54) SUBASSEMBLY OF AN ELECTRICAL MACHINE AND ELECTRICAL MACHINE WITH ONE SUCH SUBASSEMBLY

(75) Inventors: Andreas Gründl, München (DE); Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 0 days.

(21) Appl. No.: 10/469,886

(22) PCT Filed: Mar. 5, 2002

(86) PCT No.: PCT/EP02/02407

§ 371 (c)(1),
(2), (4) Date: Mar. 5, 2004

(87) PCT Pub. No.: WO02/071581

PCT Pub. Date: Sep. 12, 2002

(65) Prior Publication Data

US 2004/0130219 A1 Jul. 8, 2004

(30) Foreign Application Priority Data

Mar. 5, 2001 (DE) .......................................... 101 10 466

(51) Int. Cl.$^7$ ................................................. H02K 1/06
(52) U.S. Cl. ...................................... 310/217; 310/216
(58) Field of Search ................................ 310/216–218, 310/254, 258, 259, 42

(56) References Cited

U.S. PATENT DOCUMENTS

| 4,114,019 | A | | 9/1978 | Sandor | |
| 5,942,831 | A | * | 8/1999 | Yamada et al. | ............. 310/217 |
| 6,246,142 | B1 | * | 6/2001 | Asao et al. | ................. 310/217 |
| 6,396,187 | B1 | * | 5/2002 | Rothman | ..................... 310/216 |
| 6,448,686 | B1 | * | 9/2002 | Dawson et al. | ............. 310/254 |

FOREIGN PATENT DOCUMENTS

| DE | 974711 | 4/1961 | |
| DE | 1140638 | 6/1963 | |
| DE | 1961948 | 6/1970 | ............ H02K/1/30 |
| DE | 3027987 A | 2/1982 | ......... H02K/15/02 |
| DE | 3906368 A1 | 9/1989 | ......... H02K/15/02 |
| DE | 69204322 T2 | 4/1996 | ............ H02K/1/06 |
| DE | 10028097 A1 | 2/2001 | ............ H02K/1/22 |
| EP | 0629034 A2 | 12/1994 | ............ H02K/1/16 |

* cited by examiner

*Primary Examiner*—Dang Le
(74) *Attorney, Agent, or Firm*—Wood, Herron & Evans, LLP

(57) ABSTRACT

The invention relates to an assembly of an electric machine with at least two abutting circular ring or circular disk-shaped sheet metal layers, wherein each of the sheet metal layers is formed by several circular ring or circular disk-shaped sheet metal segments which are arranged concentrically about a centre axis, of which two each are abutting under the formation of a connecting joint and comprise a predetermined minimum cross-sectional area in the radial direction, and with the sheet metal segments of abutting sheet metal layers partially overlapping one another in the circumferential direction and are joined by welds distributed along the circumferential area, with the number of welds between a connecting joint of two sheet metal segments of a sheet metal layer and a connecting joint of two sheet metal segments of a neighbouring sheet metal layer being calculated in such a manner that the sum of the effective areas of these welds is at least approximately equal to the predetermined minimum cross-sectional area of the sheet metal segments.

14 Claims, 2 Drawing Sheets

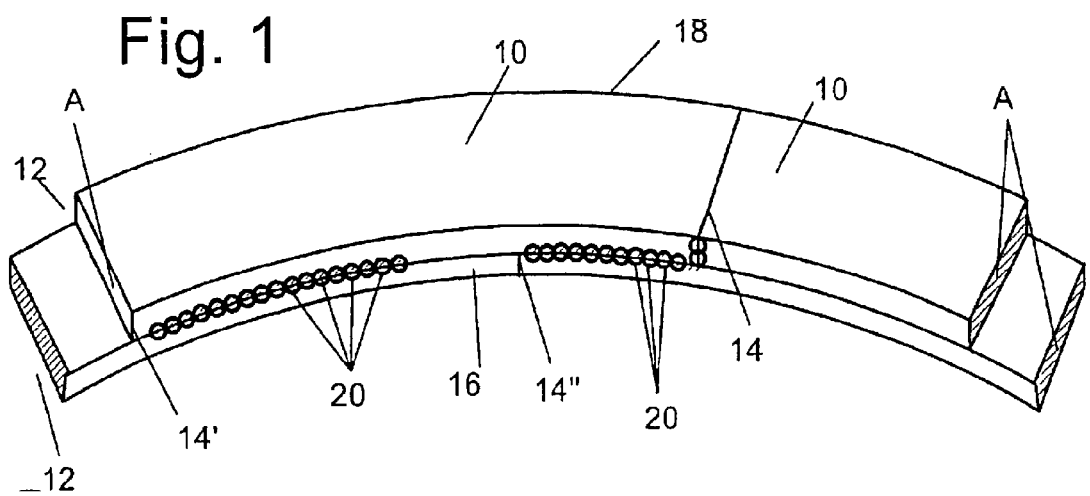
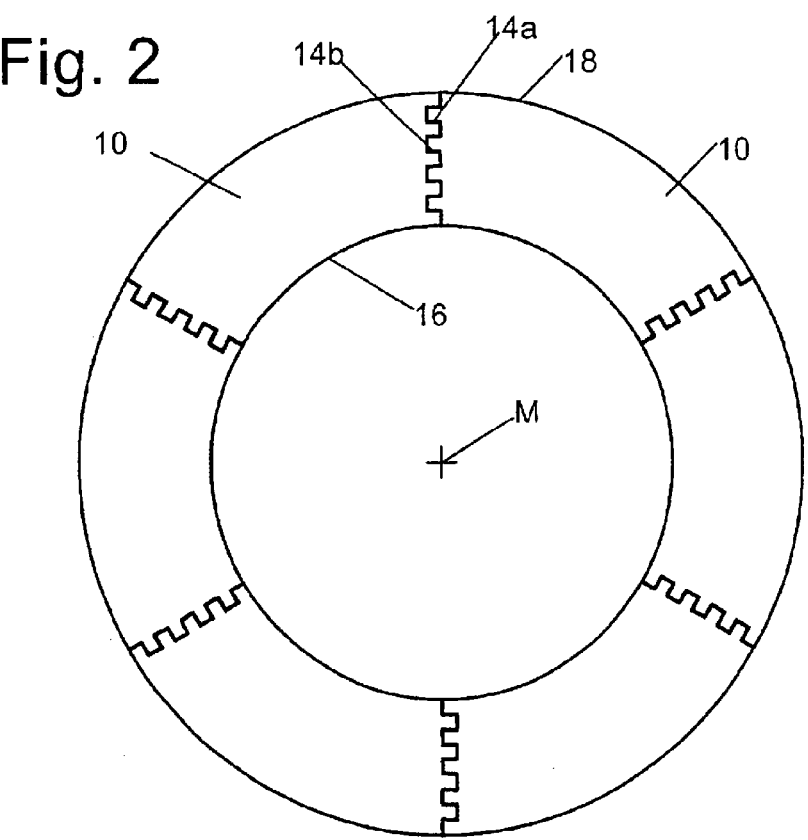

SUBASSEMBLY OF AN ELECTRICAL MACHINE AND ELECTRICAL MACHINE WITH ONE SUCH SUBASSEMBLY

BACKGROUND OF THE INVENTION

The invention relates to an assembly of an electric machine as well as to an electric machine with such an assembly.

Definitions

The term "assembly of an electric machine" as used herein refers both to a stator and a rotor of an electric machine in the form of an internal or external rotor machine. An electric machine in this context may be an electric motor as well as an electric generator. The invention is applied, in particular, to rotary machines of all kinds (synchronous, asynchronous, reluctance, permanent field machines or the like).

State of the Art

In the state of the art it is known to build the magnetically conducting parts of a machine (in particular of an alternating current machine) of laminations because of the otherwise occurring eddy currents. For the core assemblies, typically single or double-sided insulated sheet panels of a thickness between 0.35 mm and 1.5 mm of dynamo sheet metal (hot rolled electric-quality sheet) are cut to correspondingly shaped strips. From these strips stator and rotor laminations with respective recesses are punched, whereby it is aimed at producing as little scrap as possible. The stator and rotor laminations manufactured in this manner are stacked upon each other and united under pressure to laminated cores in which the recesses of the individual laminations form grooves for the stator or rotor windings to be subsequently installed.

If the individual sheet metal layers of the rotor or stator are manufactured as integral parts (so-called round plates), the punching scrap is considerable. In order to reduce the punching scrap, only annular segments (of e.g. 30°) are therefore manufactured, packeted to 8 to 10 mm high stacks and stacked above each other laterally overlapping in an annular shape. In order to prevent the individual sheet metal layers of such a laminated core or the overlapping cores to separate from one another they can be stabilised by means of through joints, synthetic resin, rivets, or the like. Rotors which are manufactured in this manner, however, have a limited maximum speed because their strength in the radial direction is not very high. Correspondingly, the natural frequency of stators which are manufactured in this manner is relatively low which results in increased damping expenditures.

From DE 36 09 368 A1 it is known to manufacture magnetic circuits of electric machines by forming cores from punched magnetic sheet metal. The cores are formed by superposing of sheets. For connecting the individual cores, these comprise in a first embodiment connector lugs at their areas facing towards each other and correspondingly shaped connector recesses. The connector lugs and the connector recesses are designed in such a manner that they join the cores by simply sliding them into each other. The superposed magnetic sheets of the individual cores are joined by welding along a vertical line. This weld serves to hold the individual cores together in a compact arrangement. In a second embodiment, the magnetic sheets lying above each other are welded to the magnetic sheets of an adjacent core along a vertical line to form a magnetic circuit of the stator.

From DE 11 40 638 it is known to connect rotors of electric machines where several sheet metal layers of the sheet metal segments result in a layer, and several layers result in the core height of the rotor. The connection is made by bolts which are inserted through holes in the sheet metal segments. The abutment areas of the sheet metal segments are staggered from sheet metal layer to sheet metal layer by one hole distance or an integral multiple of such a distance. The document discusses strength questions in detail which arise from the use of bolts in holes of overlapping sheet metal segments.

From DE 974 711 it is known to utilise an adhesive joint in lieu of the chaining bolts required at the overlapping sites for the transfer of the tangential forces caused by centrifugal forces.

From DE 692 04 322 T2 (=EP 0500 457 B1) it is known to make a stack of layers, with each layer consisting of at least two partial circular arc-shaped sheet metal elements. These sheet metal elements are joined with each other at the abutting sides by means of three alternatingly oriented dovetails. The individual layers are stacked in such a manner that the sheet metal elements are partially overlapping.

From DE 1 961 941 B, a dynamo machine with staggered ring segments is known, where the individual segments are provided at the radially outer circumferential area with a plurality of equally spaced dovetail serrations. The field poles are arranged at these radially outer dovetail serrations. Incidentally, the ring segments of this arrangement, too, are provided with holes for through bolts which keep the structure together.

DE 100 28 097 A1 discloses a rotor for an electric motor which comprises an armature which together with the bars and rings forms a cast composite body. In the manufacture of the rotor the sheet metal laminations are combined to laminated cores, and neighbouring laminations in the laminated core are tack-ed together by spot welding. In this manner, axially extending spot welds are generated. At two diametrically opposed outer sides of the armature one bandage each is then applied. The sheet metal laminations have a circular shape.

Problem on which the Invention is Based

Starting from the initially described restrictions and drawbacks of known assemblies for electric machines, the invention is based on the problem to fundamentally change these assemblies in terms of their manufacture in order to render them significantly more economic and allow their use in electric machine with high speeds or low natural frequencies, respectively.

Inventive Solution

The inventive solution of this problem is an assembly of an electric machine with at least two abutting circular ring or circular disk-shaped sheet metal layers, each of the sheet metal layers being formed by several circular ring or circular disk-shaped sheet metal segments which are arranged concentrically about a centre axis, two of which are abutting under the formation of a connecting joint and comprising a predetermined minimum cross-sectional area in the radial direction, and with the sheet metal segments of abutting sheet metal layers partially overlapping in the circumferential direction and being joined by welds along the circumferential area, with the number of welds between a connecting joint of two sheet metal segments of a sheet metal layer and a connecting joint of two sheet metal segments of a neighbouring sheet metal layer being calculated in such a manner that the sum of the effective areas of these welds is at least approximately equal to the predetermined minimum cross-sectional area of the sheet metal segments.

This completely novel design of electric machines or their assemblies, respectively, is advantageous in that virtually the maximum speed as with assemblies (rotors) made from integral round plates or comparable natural frequencies as with assemblies (stators) made from integral round plates can be achieved, although a reduction in punching scrap and manufacturing costs of up to 25% can be realised by the invention.

Advantageous Developments of the Invention

In a preferred embodiment of the invention, the connecting joint of the circular ring or circular disk-shaped sheet metal segments is oriented essentially radially. It is, however, also possible to provide the edges of the sheet metal segments which together form the connecting joint with such a structure that the sheet metal segments can be hooked or locked together. This, too, contributes to provide stability.

The welds can be arranged both at the outer and the inner circumferential area of the sheet metal segments.

It is, however, also possible to arrange some of the welds at the outer circumferential area and some at the inner circumferential area of the sheet metal segments. This applies, in particular, to assemblies whose inner diameter is relatively small and whose outer diameter is relatively large so that the minimum cross-sectional area of the sheet metal segments is also relatively large. If the individual segments of such configurations are to be relatively small (e.g. 30°), it may be necessary to arrange welds both on the inner and outer circumference.

The welds are preferably formed essentially circular or oval and are made by laser welding.

The sheet metal segments to be joined by welds of abutting sheet metal layers overlap each other in the circumferential direction by 20 to 70%, preferably by 50%. It is, however, also possible to vary the extent of overlapping or to so select the extent of overlapping that the connecting joints are staggered from one sheet metal layer to the next along the circumference.

If the sum of the welds along the circumference of the sheet metal segments of abutting sheet metal layers were not sufficient, it is possible to additionally close the connecting joint of two adjacent sheet metal segments of a sheet metal layer by means of welds at least partially in the area of the circumferential area. This can also be carried out both at the inner and the outer circumferential area.

BRIEF DESCRIPTION OF THE DRAWING

The figures illustrate details of the invention in different embodiments; wherein:

FIG. 1 shows a schematic section of sheet metal segments of abutting sheet metal layers in a perspective plan view of a first embodiment;

FIG. 2 shows a schematic plan view of an assembly according to the invention in a second embodiment;

PRESENTLY PREFERRED EMBODIMENT OF THE INVENTION

Figure 3:
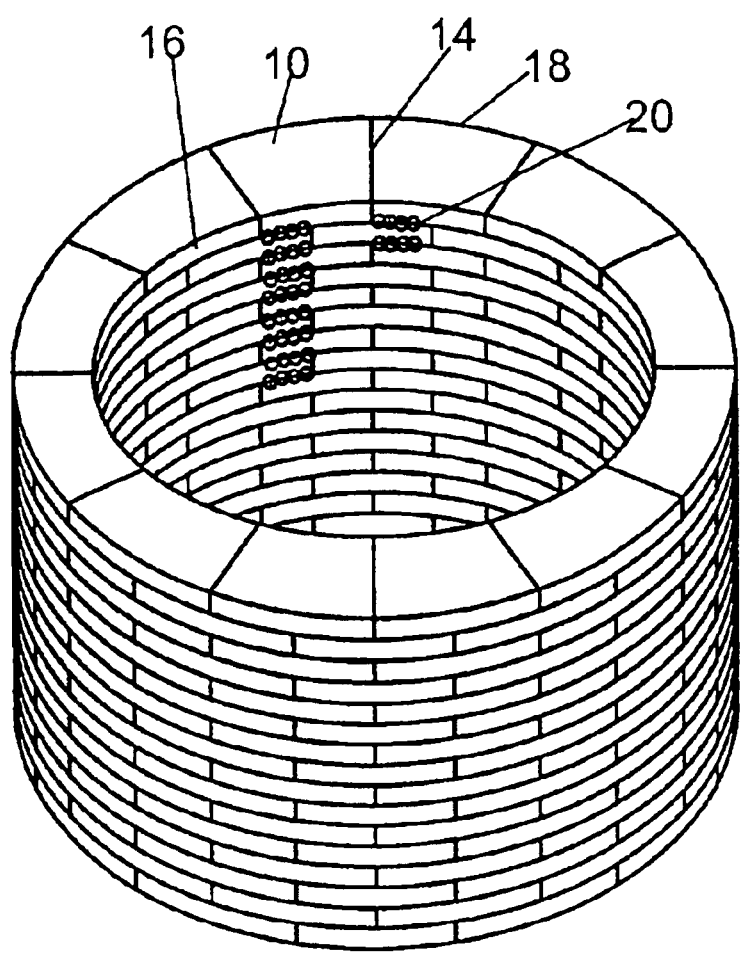
FIG. 3 shows an inventive assembly in which the welds are arranged on the outer circumference.

The section shown in FIG. 1 of an inventive assembly is a rotor of an external rotor machine, in which, however, for the sake of clarity the electric details (squirrel-cage winding etc.) are omitted. The assembly is formed from sheet metal segments 10. For the formation of one sheet metal layer 12 several circular ring segment-shaped sheet metal segments 10 are arranged adjacent to one another, with two sheet metal segments 10 each abutting at a connecting joint 14. A plurality of such sheet metal layers 12 stacked to the desired height results in the assembly.

The sheet metal segments 10 are concentrically arranged about a centre axis M (see FIG. 2) and have a predetermined minimum cross-sectional area A each in the radial direction (see FIG. 1) which influences the resistance against centrifugal forces. The sheet metal segments 10 of superposed sheet metal layers 12 overlap one another in the circumferential direction by approx. 25% in the shown example and are joined with each other by means of welds 20 which are distributed along the circumferential area. The number of the welds 20 between one connecting joint 14' of two sheet metal segments 10 of one sheet metal layer 12 (in the example, the connecting joint 14 on the left hand edge of the upper sheet metal layer 12 in FIG. 1) and a neighbouring connecting joint 14'' of two sheet metal segments 10 of a neighbouring sheet metal layer 12 (in the example, the connecting joint 14'' in the middle of the lower sheet metal layer 12 in FIG. 1) is calculated in such a manner that the sum of the effective areas of these essentially circular welds 20 approximately equals the cross-sectional area (A) of the sheet metal segments. In the middle upper connecting joint 14 of FIG. 1, the neighbouring sheet metal segments 10 of the upper sheet metal layer 12 are also closed by means of welds 20 in the area of the inner circumferential area 16.

In the example illustrated in FIG. 1, the connecting joints 14 of the sheet metal segments 10 are straight and oriented essentially in the radial direction. As an alternative, FIG. 2 shows that the radially oriented connecting joints 14 of the sheet metal segments 10 can be hooked together by means of teeth 14a, 14b, which also increases the stability of the assembly.

In the embodiment according to FIG. 1, the welds 20 are arranged at the inner circumferential area of the sheet metal segments 10 and are produced by means of laser welding.

In the following, a calculation example is given in tabular form from which the relevant dimensions for an embodiment of a rotor can be taken.

| | |
|---|---|
| Rotor inner radius: | 150 mm |
| Rotor outer radius: | 180 mm |
| Sheet metal thickness of rotor: | 0.35 mm |
| Rotor cross-section area | 10.5 mm$^2$ |
| Weld radius | 0.17 mm |
| Weld area: | 0.1 mm$^2$ |
| Number of segments: | 12 |
| Degree of overlapping: | 0.5 |
| Number of welds: | 105 |
| Length of welds: | 35.7 mm |
| Segment outer length: | 94.2 mm |
| Segment inner length: | 78.5 mm |

As can be seen the length of the weld spots (arranged adjacent to one another) in this example relative to the segment inner length or the segment outer length is so short that with the selected degree of overlapping (i.e. the dimension by which a sheet metal segment overlaps a sheet metal segment of the next (or the previous) layer), the weld spots can be arranged both at the inner circumference and at the outer circumference. In the above embodiments it is assumed that the individual welds are essentially circular and not overlapping one another. It is, however, also possible that the weld spots are overlapping. In this case, the effective sum of the weld spots is determined as a function of the degree of overlapping.

FIG. 3 shows an assembly with the welds being arranged at the outer circumference. Moreover, identical reference numerals identify corresponding components. For the sake of clarity, the weld spots 20 are depicted at only a few places.

Moreover, the figures serve as schematic representations only, the actual dimensions and proportions of functional embodiments of the invention may be different therefrom.

What is claimed is:

1. An assembly of an electric machine with
    at least two abutting circular ring or circular disk-shaped sheet metal layers (12), wherein
    each of the sheet metal layers (12) is formed by several circular ring or circular disk-shaped sheet metal segments (10)
    which are arranged concentrically about a centre axis (M),
    of which two each are abutting under the formation of a connecting joint (14) and
    comprise a predetermined minimum cross-sectional area (A) in the radial direction, and with
    the sheet metal segments (10) of abutting sheet metal layers (12) partially overlapping one another in the circumferential direction, characterised in that
    the sheet metal segments (10) of abutting sheet metal layers (12) are joined by welds (20) distributed along the circumferential area, with the number of welds (20) between a connecting joint (14) of two sheet metal segments (10) of a sheet metal layer (12) and a connecting joint (14) of two sheet metal segments (10) of a neighbouring sheet metal layer (12) being calculated in such a manner that the sum of the effective areas of these welds (20) is at least approximately equal to the predetermined minimum cross-sectional area (A) of the sheet metal segments (10).

2. The assembly according to claim 1, wherein the connecting joint (14) of circular ring or circular shaped sheet metal segments (10) is oriented essentially radially.

3. The assembly according to claim 1, wherein the welds (20) are arranged at the outer or inner circumferential area (16, 18) of the sheet metal segments (10).

4. The assembly according to claim 1, wherein some of the welds (20) are arranged at the outer circumferential area (18) and some are arranged at the inner circumferential area (16) of the sheet metal segments (10).

5. The assembly according to claim 1, wherein the welds (20) are shaped essentially circular or oval.

6. The assembly according to claim 1, wherein the welds (20) are produced by means of laser welding.

7. The assembly according to claim 1, wherein the sheet metal segments (10) of abutting sheet metal layer (12) overlap each other by 20 to 70% in the circumferential direction.

8. The assembly according to claim 1, wherein the connecting joint (14) of two adjacent sheet metal segments (10) of one sheet metal layer (12) is closed at least partially in the region of the circumferential area.

9. An electric machine, wherein a stator and/or a rotor is configured as an assembly according to claim 1.

10. An assembly of an electric machine with
    at least two abutting circular ring or circular disk-shaped sheet metal layers (12), wherein
    each of the sheet metal layers (12) is formed by several circular ring or circular disk-shaped sheet metal segments (10)
    which are arranged concentrically about a centre axis (M),
    of which two each are abutting under the formation of a connecting joint (14) and
    comprise a predetermined minimum cross-sectional area (A) in the radial direction, and with
    the sheet metal segments (10) of abutting sheet metal layers (12) partially overlapping one another in the circumferential direction, characterised in that
    the sheet metal segments (10) of abutting sheet metal layers (12) are joined by welds (20) distributed along the circumferential area, with the number of welds (20) between a connecting joint (14) of two sheet metal segments (10) of a sheet metal layer (12) and a neighboring connecting joint (14") of two sheet metal segments (10) of a neighbouring sheet metal layer (12) being calculated in such a manner that the sum of the effective areas of these welds (20) is at least approximately equal to the predetermined minimum cross-sectional area (A) of the sheet metal segments (10).

11. The assembly according to claim 10, wherein the connecting joint (14) of circular ring or circular shaped sheet metal segments (10) is oriented essentially radially.

12. The assembly according to claim 10, wherein the welds (20) are arranged at the outer or inner circumferential area (16, 18) of the sheet metal segments (10).

13. The assembly according to claim 10, wherein some of the welds (20) are arranged at the outer circumferential area (18) and some are arranged at the inner circumferential area (16) of the sheet metal segments (10).

14. The assembly according to claim 10, wherein the welds (20) are shaped essentially circular or oval.

* * * * *